United States Patent
Wu

(10) Patent No.: US 11,333,848 B2
(45) Date of Patent: May 17, 2022

(54) FOUR-PIECE OPTICAL LENS SYSTEM

(71) Applicant: NEWMAX TECHNOLOGY CO., LTD., Taichung (TW)

(72) Inventor: Kun-Rui Wu, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 207 days.

(21) Appl. No.: 16/734,418

(22) Filed: Jan. 6, 2020

(65) Prior Publication Data
US 2021/0208366 A1   Jul. 8, 2021

(51) Int. Cl.
G02B 9/34      (2006.01)
G02B 13/00     (2006.01)
H04N 5/225     (2006.01)

(52) U.S. Cl.
CPC ............ G02B 9/34 (2013.01); G02B 13/004 (2013.01); *H04N 5/2254* (2013.01); *H04N 5/2257* (2013.01)

(58) Field of Classification Search
CPC ...... G02B 9/34; G02B 13/004; G02B 15/144; G02B 15/1441; G02B 15/144105
See application file for complete search history.

(56) References Cited

U.S. PATENT DOCUMENTS 8,456,766 B2 *   6/2013   Tang ............... G02B 13/004
                                                         359/771

\* cited by examiner

*Primary Examiner* — Joseph P Martinez
(74) *Attorney, Agent, or Firm* — Bruce Stone LLP; Joseph A. Bruce

(57) ABSTRACT

A four-piece optical lens system includes, in order from the object side to the image side: a stop; a first lens element with a positive refractive power; a second lens element with a negative refractive power; a third lens element with a positive refractive power; a fourth lens element with a negative refractive power, wherein a focal length of the first lens element and the second lens element combined is f12, a focal length of the third lens element is f3, and they satisfy the relation: 0.6<f12/f3<1.6, such arrangements not only can be applied to a portable electronic product, but also has a long focal length, high pixel and low height. Moreover, the resolution can be improved evidently.

11 Claims, 12 Drawing Sheets

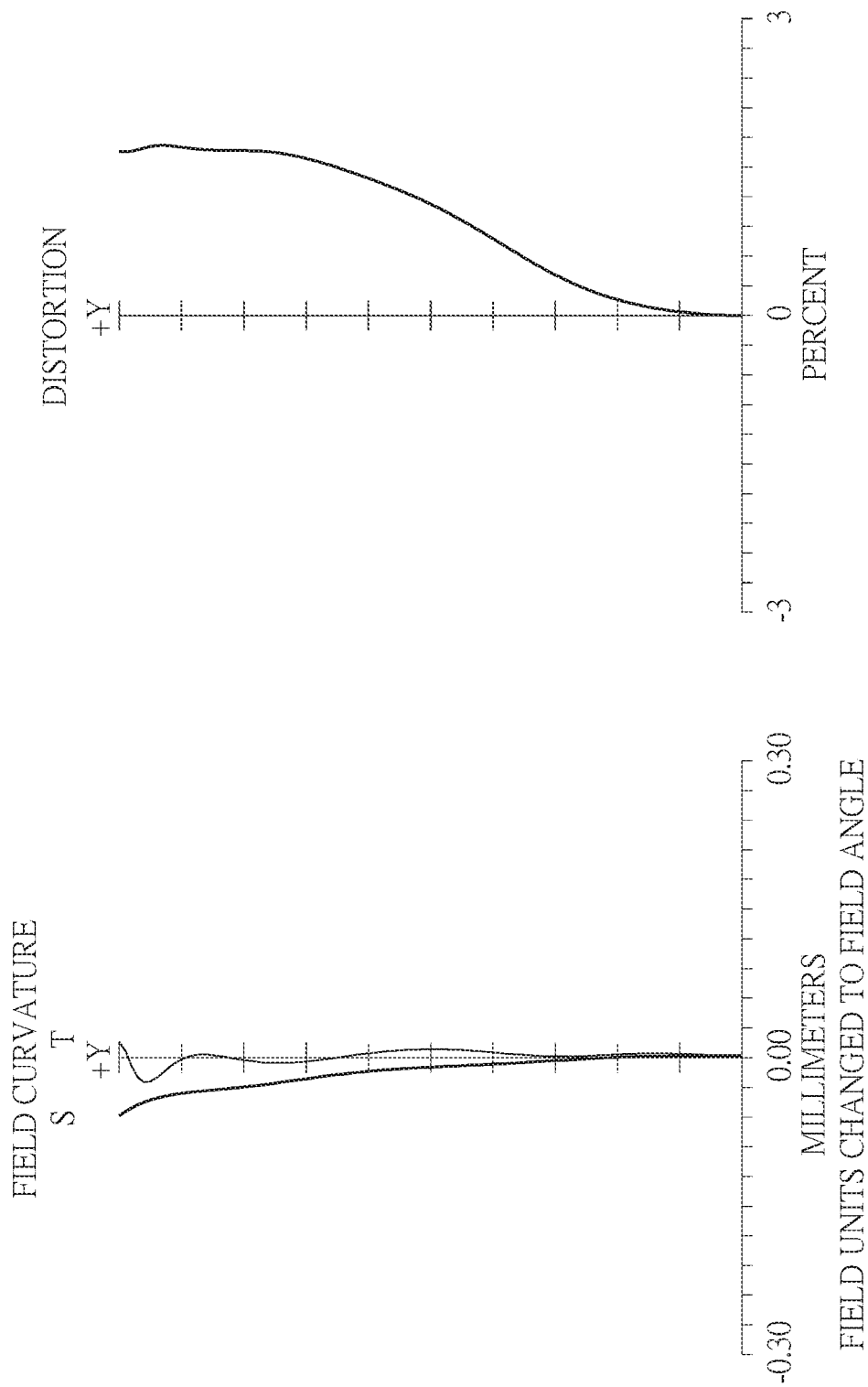

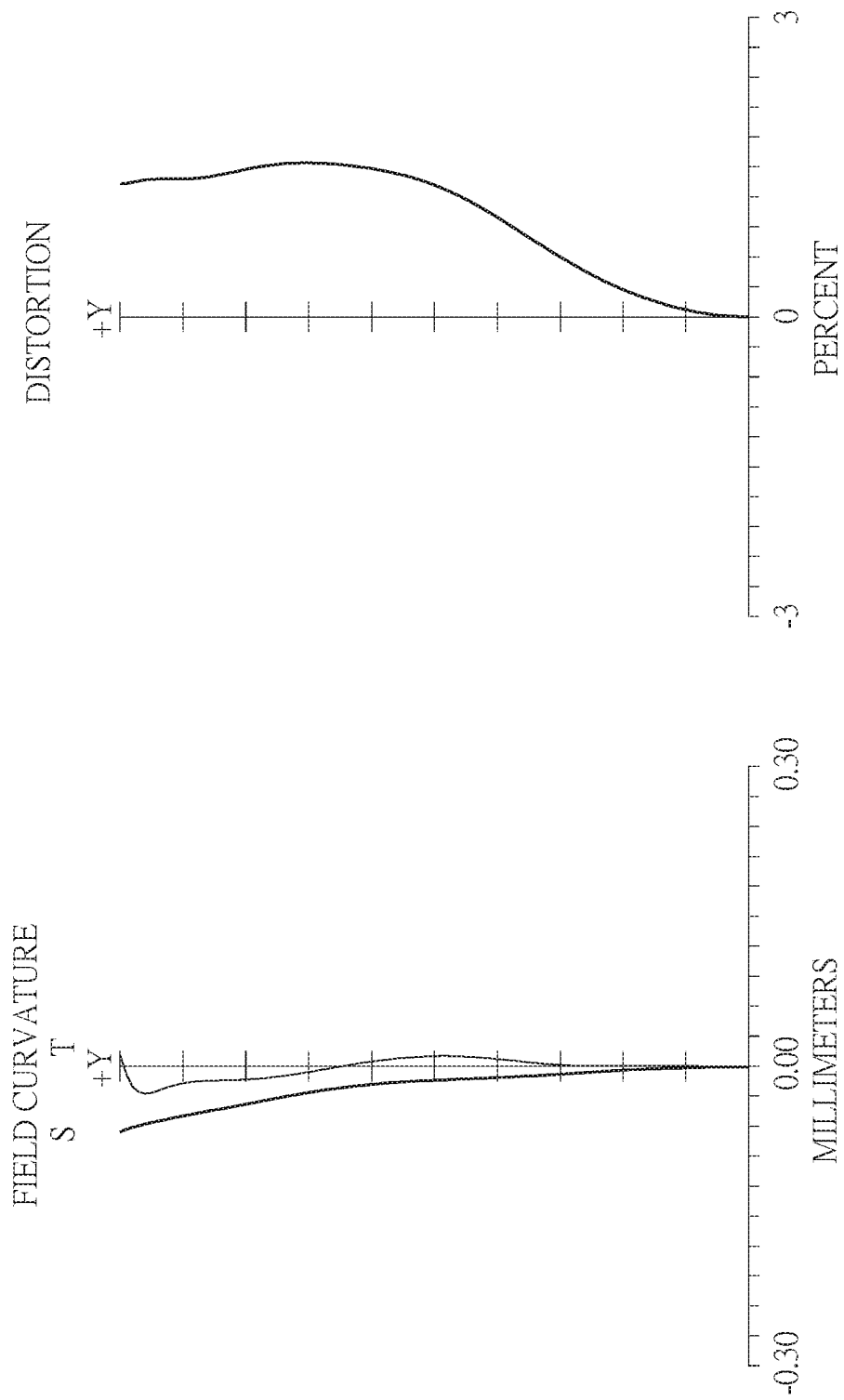

FOUR-PIECE OPTICAL LENS SYSTEM

BACKGROUND

Field of the Invention

The present invention relates to a four-piece optical lens system, and more particularly to a miniaturized four-piece optical lens system applicable to electronic products.

Description of the Prior Art

Miniaturized optical lens systems with high resolution have been the standard equipment for various mobile devices, and as the advanced semiconductor manufacturing technologies have allowed the pixel size of electronic sensors to be reduced and compact, there's an increasing demand for imaging lens featuring finer resolution and better image quality.

Conventional miniaturized lens systems used in portable electronic products mostly consist of four lens elements, however, miniaturization, high performance and high resolution have become the trend of modern electronic products, such as, mobile phone. As the pixel size of electronic imaging sensors gradually becomes smaller and smaller, and the system requires higher image quality. The conventional optical lens system comprising four lens elements cannot satisfy the requirements of higher resolution optical lens systems.

The present invention mitigates and/or obviates the aforementioned disadvantages.

SUMMARY

The primary objective of the present invention is to provide a four-piece optical lens system without having an excessively long total track length, the four-piece optical lens system not only can be applied to a portable electronic product, but also has a long focal length, high pixel and low height.

Therefore, a four-piece optical lens system in accordance with the present invention comprises a stop and a lens group having four lens elements, in order from an object side to an image side: the stop; a first lens element with a positive refractive power having an object-side surface being convex near an optical axis and an image-side surface being concave near the optical axis, at least one of the object-side surface and the image-side surface of the first lens element being aspheric; a second lens element with a negative refractive power having an object-side surface being concave near the optical axis and an image-side surface being concave near the optical axis, at least one of the object-side surface and the image-side surface of the second lens element being aspheric; a third lens element with a positive refractive power having an object-side surface being concave near the optical axis and an image-side surface being convex near the optical axis, at least one of the object-side surface and the image-side surface of the third lens element being aspheric; a fourth lens element with a negative refractive power having an image-side surface being concave near the optical axis, at least one of an object-side surface and the image-side surface of the fourth lens element being aspheric and provided with an inflection point.

Preferably, a focal length of the first lens element and the second lens element combined is f12, a focal length of the third lens element is f3, and they satisfy the relation: $0.6 < f12/f3 < 1.6$, so that the resolution can be improved evidently.

Preferably, a focal length of the first lens element is f1, the focal length of the third lens element is f3, and they satisfy the relation: $0.4 < f1/f3 < 1.2$, it will be favorable to reduce the sensitivity and the aberration of the system.

Preferably, the focal length of the first lens element is f1, a focal length of the fourth lens element is f4, and they satisfy the relation: $-1.5 < f1/f4 < -0.7$, so that the positive refractive power of the first lens element can be distributed effectively, so as to reduce the sensitivity of the four-piece optical lens system.

Preferably, a focal length of the second lens element is f2 the focal length of the third lens element is f3, and they satisfy the relation: $-3.2 < f2/f3 < -1.7$, it is favorable to correct the aberration of the system.

Preferably, the focal length of the second lens element is f2, the focal length of the fourth lens element is f4, and they satisfy the relation: $2.7 < f2/f4 < 4.1$, so that the refractive power of the system can be balanced, it will be favorable to reduce the sensitivity of the system to tolerance.

Preferably, the focal length of the first lens element is f1, a focal length of the second lens element and the third lens element combined is f23, and they satisfy the relation: $0.2 < f1/f23 < 1.1$, so that the resolution can be improved evidently.

Preferably, the focal length of the first lens element and the second lens element combined is f12, the focal length of the fourth lens element is f4, and they satisfy the relation: $-2.0 < f12/f4 < -1.0$, which can effectively correct image distortion.

Preferably, a radius of curvature of the object-side surface of the third lens element is R5, a radius of curvature of the image-side surface of the third lens element is R6, and they satisfy the relation: $1.5 < R5/R6 < 2.7$, which can reduce the spherical aberration and astigmatism of the four-piece optical lens system.

Preferably, the focal length of the second lens element is f2, a central thickness of the fourth lens element along the optical axis is CT4, and they satisfy the relation: $-29 < f2/CT4 < -20$, which can improve the peripheral resolution and illuminance of the system.

Preferably, the focal length of the third lens element is f3, a central thickness of the first lens element along the optical axis is CT1, and they satisfy the relation: $3 < f3/CT1 < 7.2$, so that it will be favorable to correct the aberration of the system and improve the image quality.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 2B shows the image plane curve and the distortion curve of the second embodiment of the present invention;

FIG. 5B shows the image plane curve and the distortion curve of the fifth embodiment of the present invention;

DETAILED DESCRIPTION

Figure 1A:
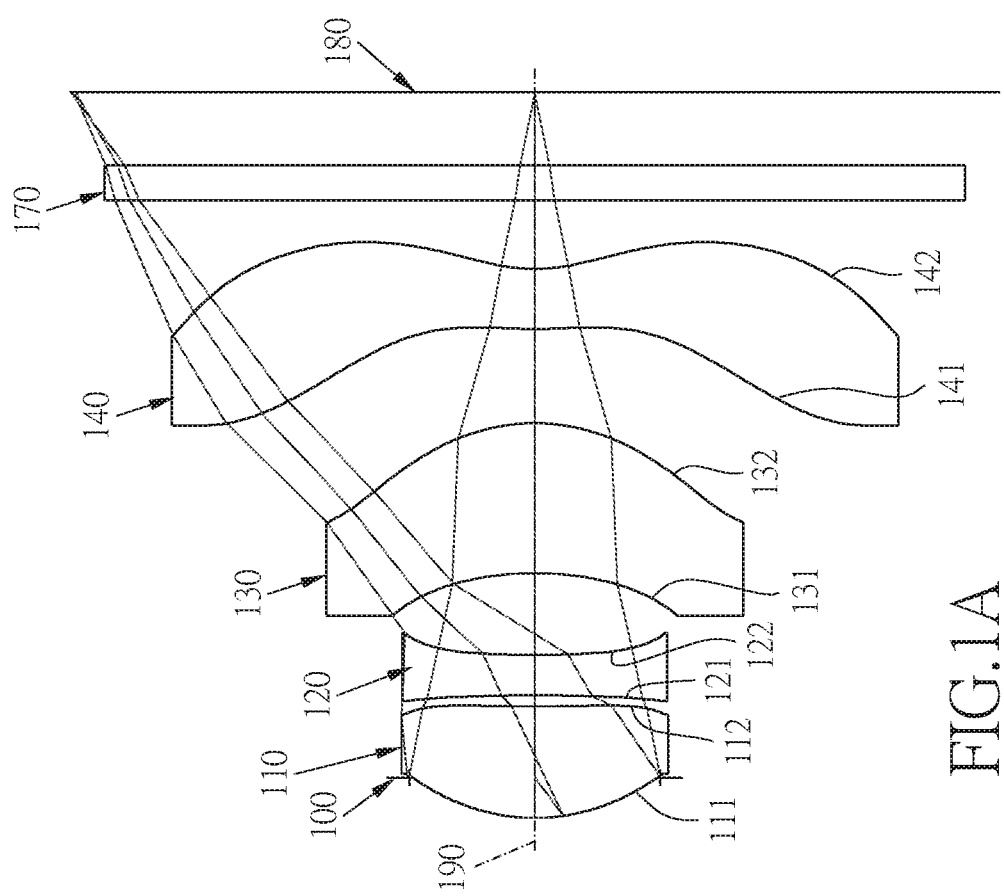
FIG. 1A shows a four-piece optical lens system in accordance with a first embodiment of the present invention.
Figure 1B:
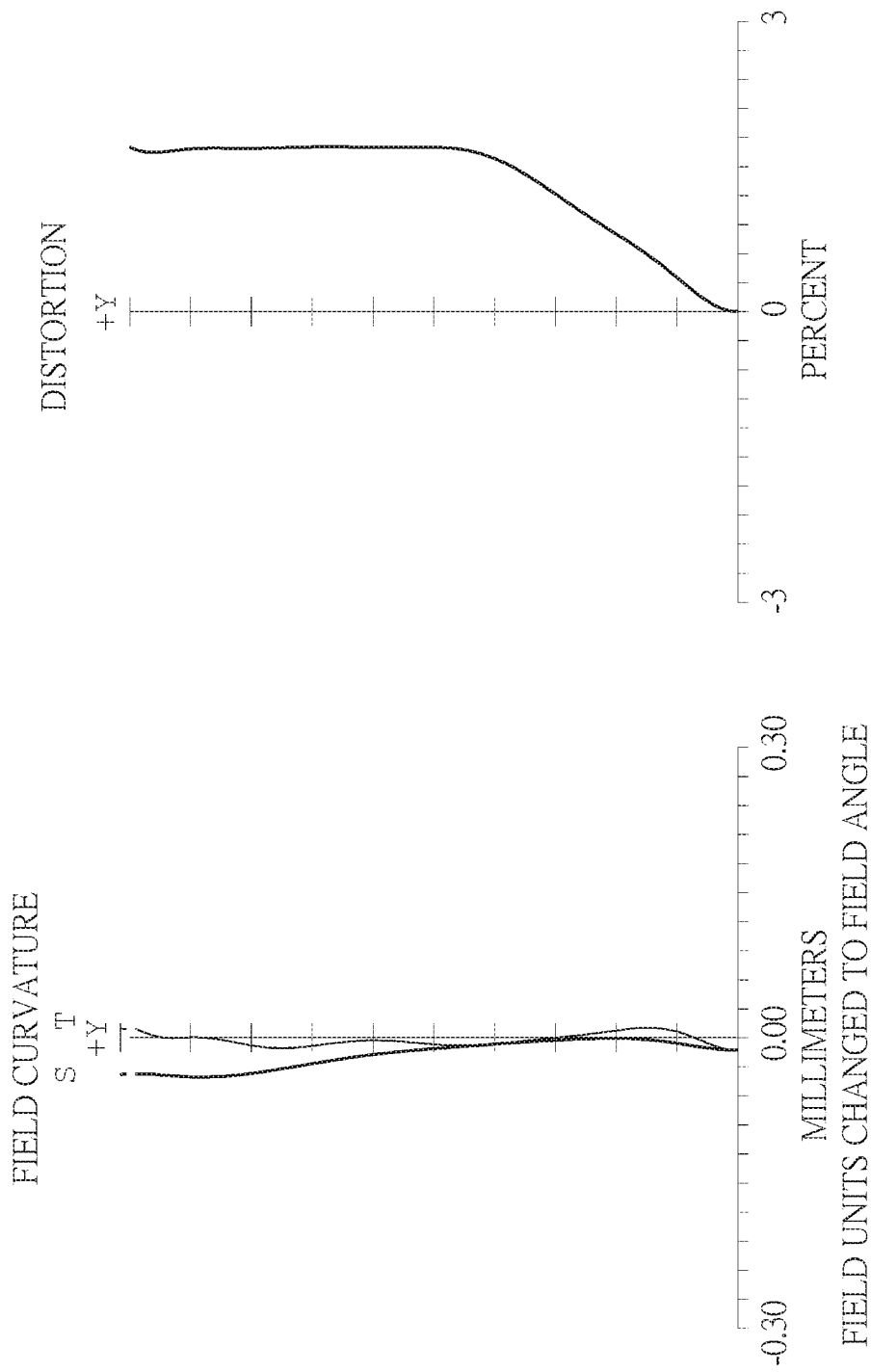
FIG. 1B shows the image plane curve and the distortion curve of the first embodiment of the present invention.

Referring to FIGS. 1A and 1B, FIG. 1A shows a four-piece optical lens system in accordance with a first embodiment of the present invention, and FIG. 1B shows, in order from left to right, the image plane curve and the distortion curve of the first embodiment of the present invention. A four-piece optical lens system in accordance with the first embodiment of the present invention comprises a stop 100 and a lens group. The lens group comprises, in order from an object side to an image side: a first lens element 110, a second lens element 120, a third lens element 130, a fourth lens element 140, an IR cut filter 170, and an image plane 180, wherein the four-piece optical lens system has a total of four lens elements with refractive power. The stop 100 is disposed between an object-side surface 111 and an image-side surface 112 of the first lens element 110.

The first lens element 110 with a positive refractive power has the object-side surface 111 being convex near an optical axis 190 and the image-side surface 112 being concave near the optical axis 190, the object-side surface 111 and the image-side surface 112 are aspheric, and the first lens element 110 is made of plastic material.

The second lens element 120 with a negative refractive power has an object-side surface 121 being concave near the optical axis 190 and the image-side surface 122 being concave near the optical axis 190, the object-side surface 121 and the image-side surface 122 are aspheric, and the second lens element 120 is made of plastic material.

The third lens element 130 with a positive refractive power has an object-side surface 131 being concave near the optical axis 190 and an image-side surface 132 being convex near the optical axis 190, the object-side surface 131 and the image-side surface 132 are aspheric, and the third lens element 130 is made of plastic material.

The fourth lens element 140 with a negative refractive power has an object-side surface 141 being convex near the optical axis 190 and an image-side surface 142 being concave near the optical axis 190, the object-side surface 141 and the image-side surface 142 are aspheric, the fourth lens element 140 is made of plastic material, and at least one of the object-side surface 141 and the image-side surface 142 is provided with at least one inflection point.

The IR cut filter 170 made of glass is located between the fourth lens element 140 and the image plane 180 and has no influence on the focal length of the four-piece optical lens system.

The equation for the aspheric surface profiles of the respective lens elements of the first embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Fh^{14} + Gh^{16}$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, F, G . . . : represent the high-order aspheric coefficients.

In the first embodiment of the present four-piece optical lens system, a focal length of the four-piece optical lens system is f, a f-number of the four-piece optical lens system is Fno, the four-piece optical lens system has a maximum view angle (field of view) FOV, and they satisfy the relations: f=3.64 mm; Fno=2.27; and FOV=76.56 degrees.

In the first embodiment of the present four-piece optical lens system, a focal length of the first lens element 110 and the second lens element 120 combined is f12, a focal length of the third lens element 130 is f3, and they satisfy the relation: f12/f3=0.832.

In the first embodiment of the present four-piece optical lens system, a focal length of the first lens element 110 is f1, the focal length of the third lens element 130 is f3, and they satisfy the relation: f1/f3=0.626.

In the first embodiment of the present four-piece optical lens system, the focal length of the first lens element 110 is f1, a focal length of the fourth lens element 140 is f4, and they satisfy the relation: f1/f4=−0.904.

In the first embodiment of the present four-piece optical lens system, a focal length of the second lens element 120 is f2, the focal length of the third lens element 130 is f3, and they satisfy the relation: f2/f3=−1.977.

In the first embodiment of the present four-piece optical lens system, the focal length of the second lens element 120 is f2, the focal length of the fourth lens element 140 is f4, and they satisfy the relation: f2/f4=2.856.

In the first embodiment of the present four-piece optical lens system, the focal length of the first lens element 110 is f1, a focal length of the second lens element 120 and the third lens element 130 combined is f23, and they satisfy the relation: f1/f23=0.424.

In the first embodiment of the present four-piece optical lens system, the focal length of the first lens element 110 and the second lens element 120 combined is f12, the focal length of the fourth lens element 140 is f4, and they satisfy the relation: f12/f4=−1.202.

In the first embodiment of the present four-piece optical lens system, a radius of curvature of the object-side surface 131 of the third lens element 130 is R5, a radius of curvature of the image-side surface 132 of the third lens element 130 is R6, and they satisfy the relation: R5/R6=1.742.

In the first embodiment of the present four-piece optical lens system, the focal length of the second lens element 120 is f2, a central thickness of the fourth lens element 140 along the optical axis 190 is CT4, and they satisfy the relation: f2/CT4=−24.367.

In the first embodiment of the present four-piece optical lens system, the focal length of the third lens element 130 is f3, a central thickness of the first lens element 110 along the optical axis 190 is CT1, and they satisfy the relation: f3/CT1=6.639.

The detailed optical data of the first embodiment is shown in table 1, and the aspheric surface data is shown in table 2.

TABLE 1

Embodiment 1
f(focal length) = 3.64 mm, Fno= 2.27, FOV = 76.56 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.240 | | | | |
| 2 | Lens 1 | 1.371 | (ASP) | 0.662 | plastic | 1.54 | 56 | 2.753 |
| 3 | | 12.883 | (ASP) | 0.065 | | | | |
| 4 | Lens 2 | −9.972 | (ASP) | 0.241 | plastic | 1.66 | 20.37 | −8.697 |
| 5 | | 14.010 | (ASP) | 0.483 | | | | |
| 6 | Lens 3 | −2.344 | (ASP) | 0.890 | plastic | 1.54 | 56 | 4.398 |
| 7 | | −1.346 | (ASP) | 0.559 | | | | |
| 8 | Lens 4 | 3.570 | (ASP) | 0.357 | plastic | 1.54 | 56 | −3.046 |
| 9 | | 1.095 | (ASP) | 0.404 | | | | |
| 10 | IR-filter | infinity | | 0.210 | glass | 1.52 | 64.2 | |
| 11 | | infinity | | 0.435 | | | | |
| 12 | Image plane | infinity | | — | | | | |

TABLE 2

Aspheric Coefficients

| surface | 2 | 3 | 4 | 5 |
|---|---|---|---|---|
| K: | −9.2179E−02 | 1.1132E+02 | 3.9020E+01 | −1.3447E+02 |
| A: | −2.9901E−03 | −4.8797E−02 | 7.8836E−02 | 1.6171E−01 |
| B: | 1.7813E−02 | 1.2762E−02 | −1.9926E−02 | 9.5528E−02 |
| C: | −1.8582E−02 | −9.9384E−01 | −6.9159E−01 | −4.9759E−01 |
| D: | −8.4551E−02 | 1.9751E+00 | 1.3824E+00 | 1.5375E+00 |
| E: | 1.3257E−01 | −1.6611E+00 | −9.8160E−01 | −2.0471E+00 |
| F: | −1.0413E−01 | 4.2224E−01 | 1.2117E−01 | 1.2366E+00 |
| G: | −4.2071E−02 | 1.0812E−01 | 1.9780E−01 | −4.7843E−02 |

| surface | 6 | 7 | 8 | 9 |
|---|---|---|---|---|
| K: | 4.8225E+00 | −5.3176E−01 | −1.5400E+02 | −8.0589E+00 |
| A: | −7.8050E−03 | −1.2337E−04 | −3.3399E−01 | −1.4821E−01 |
| B: | −7.5917E−02 | −1.4999E−03 | 2.0268E−01 | 7.3743E−02 |
| C: | 1.5086E−01 | 2.3670E−02 | −6.6661E−02 | −2.4931E−02 |
| D: | −1.9908E−02 | −2.7448E−02 | 1.3510E−02 | 5.2292E−03 |
| E: | −1.0470E−01 | 2.6314E−02 | −1.5599E−03 | −6.3153E−04 |
| F: | 8.4320E−02 | −6.5682E−03 | 8.0150E−05 | 3.3436E−05 |
| G: | 2.6935E−02 | −2.9250E−04 | −3.8380E−07 | −8.2220E−08 |

The units of the radius of curvature, the thickness and the focal length in table 1 are expressed in mm, the surface numbers 0-12 represent the surfaces sequentially arranged from the object-side to the image-side along the optical axis. In table 2, k represents the conic coefficient of the equation of the aspheric surface profiles, and A, B, C, D, E, F, G . . . : represent the high-order aspheric coefficients. The tables presented below for each embodiment are the corresponding schematic parameter, image plane curves and distortion curves, and the definitions of the tables are the same as Table 1 and Table 2 of the first embodiment. Therefore, an explanation in this regard will not be provided again.

Figure 2A:
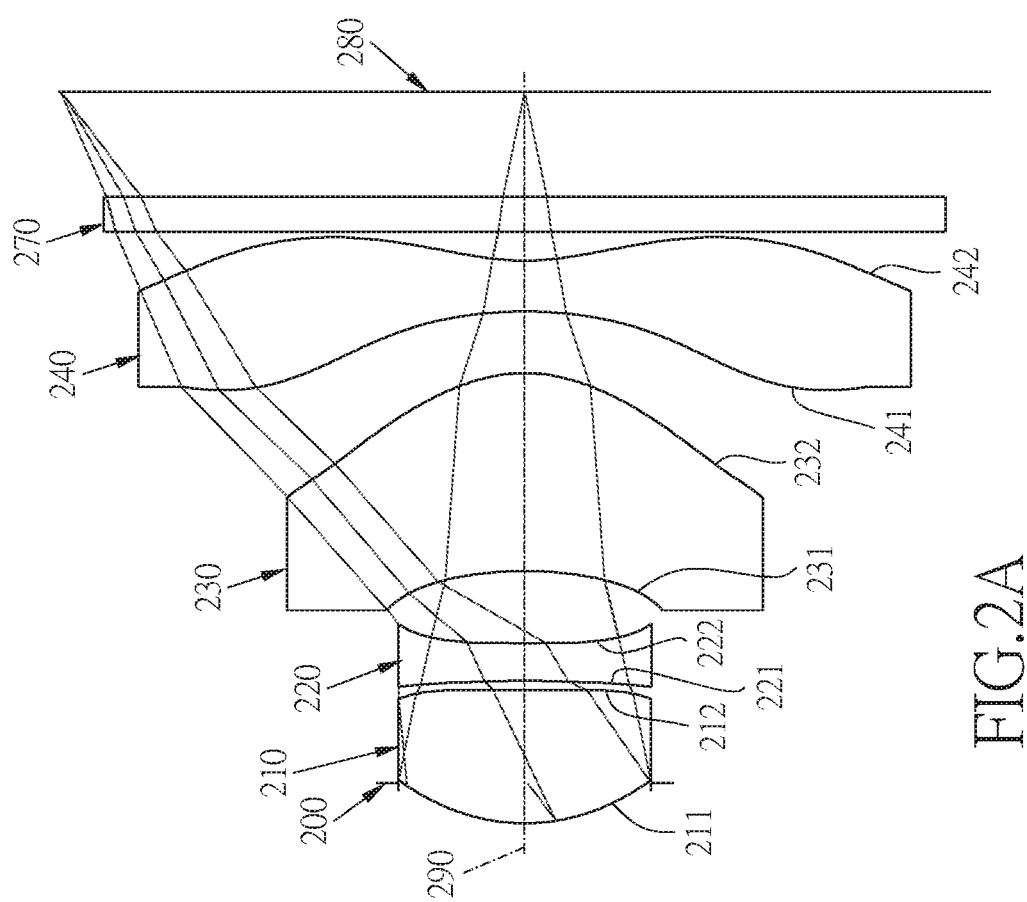
FIG. 2A shows a four-piece optical lens system in accordance with a second embodiment of the present invention.

Referring to FIGS. 2A and 2B, FIG. 2A shows a four-piece optical lens system in accordance with a second embodiment of the present invention, and FIG. 2B shows, in order from left to right, the image plane curve and the distortion curve of the second embodiment of the present invention. A four-piece optical lens system in accordance with the second embodiment of the present invention comprises a stop 200 and a lens group. The lens group comprises, in order from an object side to an image side: a first lens element 210, a second lens element 220, a third lens element 230, a fourth lens element 240, an IR cut filter 270, and an image plane 280, wherein the four-piece optical lens system has a total of four lens elements with refractive power. The stop 200 is disposed between an object-side surface 211 and an image-side surface 212 of the first lens element 210.

The first lens element 210 with a positive refractive power has the object-side surface 211 being convex near an optical axis 290 and the image-side surface 212 being concave near the optical axis 290, the object-side surface 211 and the image-side surface 212 are aspheric, and the first lens element 210 is made of plastic material.

The second lens element 220 with a negative refractive power has an object-side surface 221 being concave near the optical axis 290 and the image-side surface 222 being concave near the optical axis 290, the object-side surface 221 and the image-side surface 222 are aspheric, and the second lens element 220 is made of plastic material.

The third lens element 230 with a positive refractive power has an object-side surface 231 being concave near the optical axis 290 and an image-side surface 232 being convex near the optical axis 290, the object-side surface 231 and the image-side surface 232 are aspheric, and the third lens element 230 is made of plastic material.

The fourth lens element 240 with a negative refractive power has an object-side surface 241 being concave near the optical axis 290 and an image-side surface 242 being concave near the optical axis 290, the object-side surface 241 and the image-side surface 242 are aspheric, the fourth lens element 240 is made of plastic material, and at least one of the object-side surface 241 and the image-side surface 242 is provided with at least one inflection point.

The IR cut filter 270 made of glass is located between the fourth lens element 240 and the image plane 280 and has no influence on the focal length of the four-piece optical lens system.

The detailed optical data of the second embodiment is shown in table 3, and the aspheric surface data is shown in table 4.

TABLE 3

Embodiment 2
f(focal length) = 3.64 mm, Fno= 2.28, FOV = 76.79 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.239 | | | | |
| 2 | Lens 1 | 1.348 | (ASP) | 0.786 | plastic | 1.54 | 56 | 2.510 |
| 3 | | 68.370 | (ASP) | 0.055 | | | | |
| 4 | Lens 2 | −6.094 | (ASP) | 0.221 | plastic | 1.66 | 20.37 | −7.346 |
| 5 | | 25.381 | (ASP) | 0.427 | | | | |
| 6 | Lens 3 | −2.634 | (ASP) | 1.169 | plastic | 1.54 | 56 | 2.510 |
| 7 | | −1.042 | (ASP) | 0.363 | | | | |
| 8 | Lens 4 | −2.945 | (ASP) | 0.300 | plastic | 1.54 | 56 | −1.893 |
| 9 | | 1.648 | (ASP) | 0.168 | | | | |
| 10 | IR-filter | infinity | | 0.210 | glass | 1.52 | 64.2 | |
| 11 | | infinity | | 0.620 | | | | |
| 12 | Image plane | infinity | | — | | | | |

TABLE 4

Aspheric Coefficients

| surface | 2 | 3 | 4 | 5 |
|---|---|---|---|---|
| K: | −1.1435E+00 | −9.0000E+01 | 4.4488E+01 | 9.0000E+01 |
| A: | 4.7963E−02 | 1.7252E−02 | 2.3056E−01 | 2.4756E−01 |
| B: | 4.6242E−02 | −2.0286E−01 | −3.1943E−01 | −1.0973E−01 |
| C: | −1.3897E−01 | −6.8969E−01 | −3.4116E−01 | −7.8773E−02 |
| D: | 2.2187E−01 | 1.6033E+00 | 1.1953E+00 | 9.0647E−01 |
| E: | −1.8342E−01 | −9.6693E−01 | −6.4491E−01 | −1.5234E+00 |
| F: | 1.7905E−04 | −1.7109E−03 | −1.0429E−03 | 1.1169E+00 |
| G: | 0.0000E+00 | 0.0000E+00 | 0.0000E+00 | 0.0000E+00 |

| surface | 6 | 7 | 8 | 9 |
|---|---|---|---|---|
| K: | −1.7368E+01 | −4.5588E+00 | −2.6339E+01 | −1.2803E+01 |
| A: | −1.4586E−01 | −1.6518E−01 | −1.3901E−01 | −7.3089E−02 |
| B: | −2.1413E−01 | 1.5273E−01 | 6.0831E−02 | 2.4250E−02 |
| C: | 1.1575E+00 | −1.1745E−01 | −5.3724E−03 | −5.0588E−03 |
| D: | −3.0438E+00 | 6.4410E−02 | −1.6450E−03 | 4.1274E−04 |
| E: | 3.7398E+00 | −1.6762E−02 | 4.0460E−04 | 2.1219E−05 |
| F: | −1.9076E+00 | 1.3438E−03 | −2.6221E−05 | −3.6358E−06 |
| G: | 0.0000E+00 | 0.0000E+00 | 0.0000E+00 | 0.0000E+00 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 3.64 | f1/f23 | 0.866 |
| Fno | 2.28 | f12/f3 | 1.352 |
| FOV[deg.] | 76.79 | f12/f4 | −1.793 |
| f1/f3 | 1.000 | R5/R6 | 2.527 |
| f1/f4 | −1.326 | f2/CT4 | −24.487 |
| f2/f3 | −2.927 | f3/CT1 | 3.193 |
| f2/f4 | 3.880 | | |

Figure 3A:
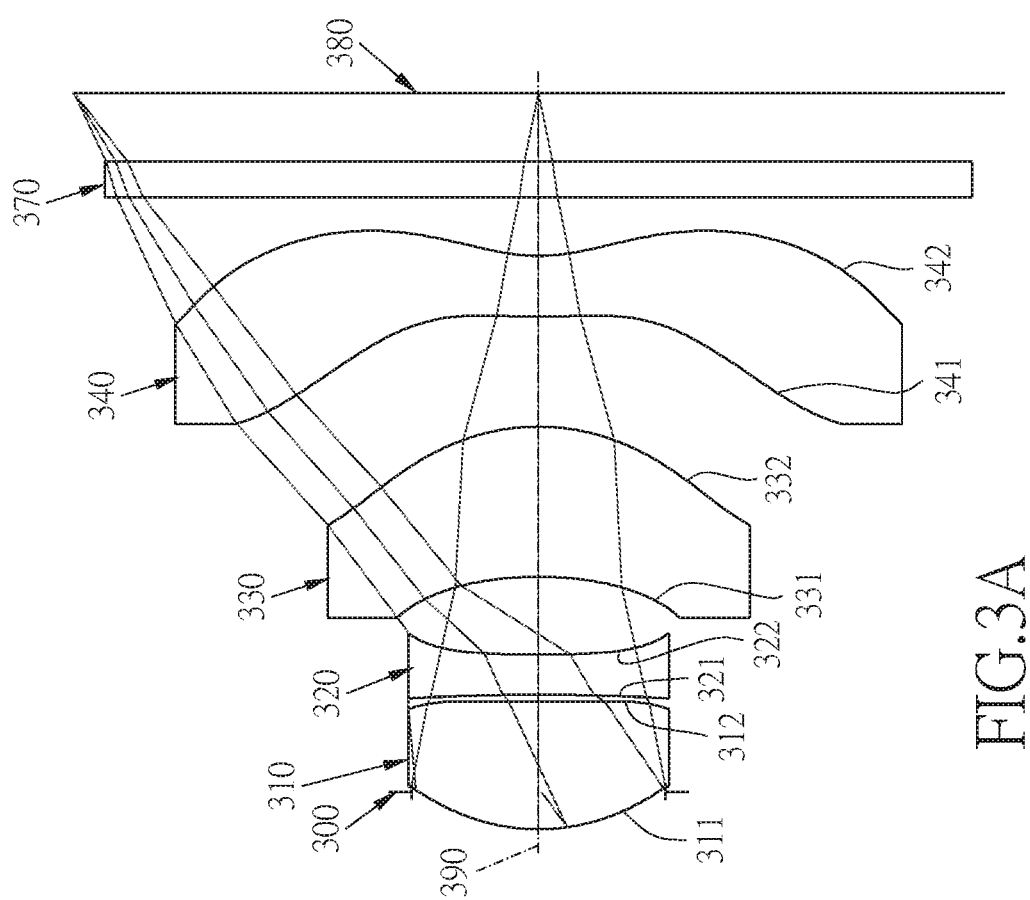
FIG. 3A shows a four-piece optical lens system in accordance with a third embodiment of the present invention.
Figure 3B:
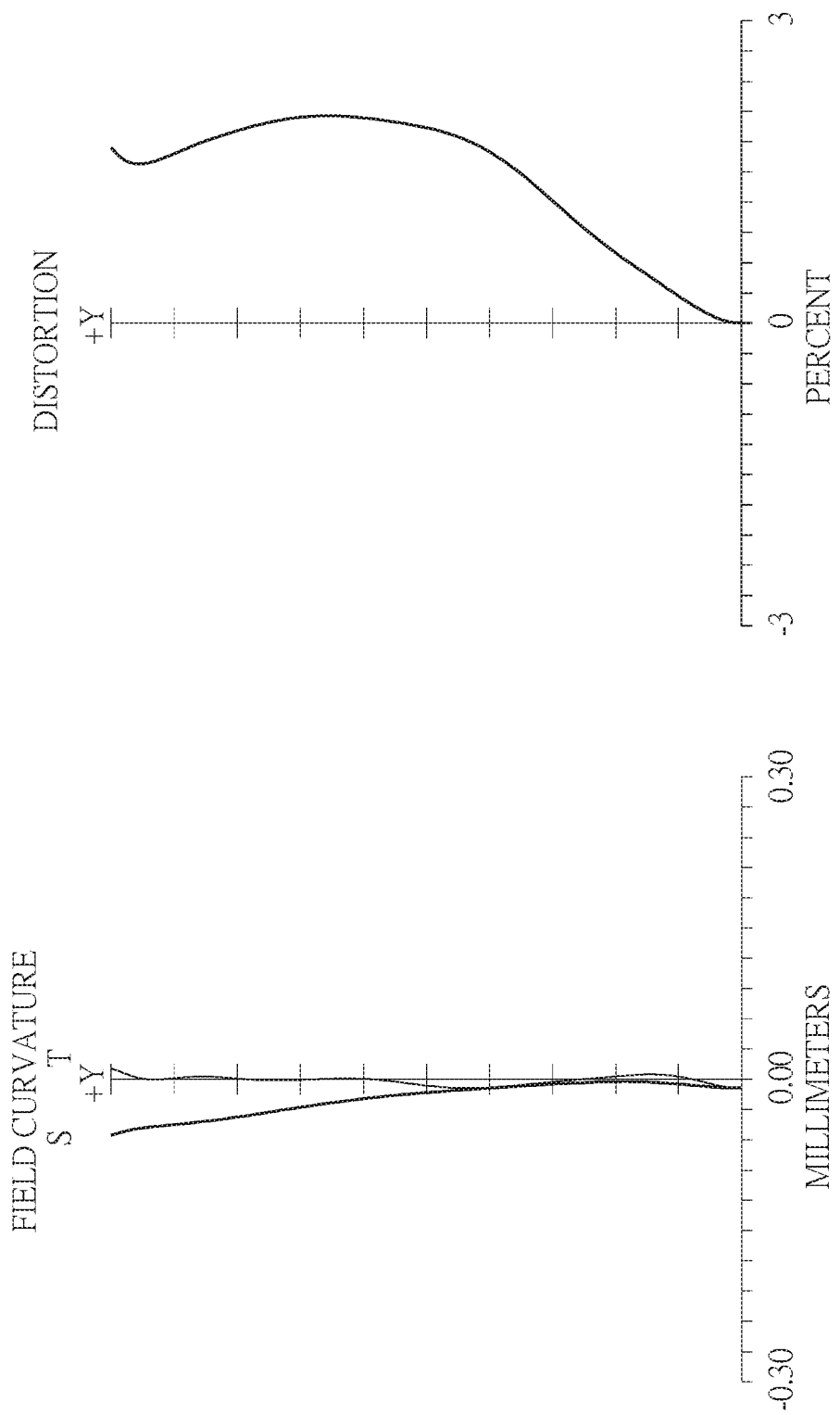
FIG. 3B shows the image plane curve and the distortion curve of the third embodiment of the present invention.

Referring to FIGS. 3A and 3B, FIG. 3A shows a four-piece optical lens system in accordance with a third embodiment of the present invention, and FIG. 3B shows, in order from left to right, the image plane curve and the distortion curve of the third embodiment of the present invention. A four-piece optical lens system in accordance with the third embodiment of the present invention comprises a stop 300 and a lens group. The lens group comprises, in order from an object side to an image side: a first lens element 310, a second lens element 320, a third lens element 330, a fourth lens element 340, an IR cut filter 370, and an image plane 380, wherein the four-piece optical lens system has a total of four lens elements with refractive power. The stop 300 is disposed between an object-side surface 311 and an image-side surface 312 of the first lens element 310.

The first lens element 310 with a positive refractive power has the object-side surface 311 being convex near an optical axis 390 and the image-side surface 312 being concave near the optical axis 390, the object-side surface 311 and the image-side surface 312 are aspheric, and the first lens element 310 is made of plastic material.

The second lens element 320 with a negative refractive power has an object-side surface 321 being concave near the optical axis 390 and the image-side surface 322 being concave near the optical axis 390, the object-side surface 321 and the image-side surface 322 are aspheric, and the second lens element 320 is made of plastic material.

The third lens element 330 with a positive refractive power has an object-side surface 331 being concave near the optical axis 390 and an image-side surface 332 being convex near the optical axis 390, the object-side surface 331 and the image-side surface 332 are aspheric, and the third lens element 330 is made of plastic material.

The fourth lens element 340 with a negative refractive power has an object-side surface 341 being convex near the optical axis 390 and an image-side surface 342 being concave near the optical axis 390, the object-side surface 341 and the image-side surface 342 are aspheric, the fourth lens element 340 is made of plastic material, and at least one of the object-side surface 341 and the image-side surface 342 is provided with at least one inflection point.

The IR cut filter 370 made of glass is located between the fourth lens element 340 and the image plane 380 and has no influence on the focal length of the four-piece optical lens system.

The detailed optical data of the third embodiment is shown in table 5, and the aspheric surface data is shown in table 6.

TABLE 5

Embodiment 3
f(focal length) = 3.66 mm, Fno = 2.28, FOV = 76.24 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.220 | | | | |
| 2 | Lens 1 | 1.386 | (ASP) | 0.743 | plastic | 1.54 | 56 | 2.788 |
| 3 | | 12.616 | (ASP) | 0.043 | | | | |
| 4 | Lens 2 | −10.930 | (ASP) | 0.236 | plastic | 1.66 | 20.37 | −9.756 |
| 5 | | 16.228 | (ASP) | 0.454 | | | | |
| 6 | Lens 3 | −2.448 | (ASP) | 0.877 | plastic | 1.54 | 56 | 5.234 |
| 7 | | −1.485 | (ASP) | 0.643 | | | | |
| 8 | Lens 4 | 4.086 | (ASP) | 0.355 | plastic | 1.54 | 56 | −3.147 |
| 9 | | 1.172 | (ASP) | 0.343 | | | | |
| 10 | IR-filter | infinity | | 0.210 | glass | 1.52 | 64.2 | |
| 11 | | infinity | | 0.400 | | | | |
| 12 | Image plane | infinity | | — | | | | |

TABLE 6

| Aspheric Coefficients | | | | |
|---|---|---|---|---|
| surface | 2 | 3 | 4 | 5 |
| K: | −1.3183E−01 | 6.9284E+01 | 3.8301E+00 | 3.1749E+01 |
| A: | −6.8784E−03 | −5.4701E−02 | 8.6918E−02 | 1.6760E−01 |
| B: | 2.0984E−02 | −4.7689E−03 | −1.9716E−02 | 1.1491E−01 |
| C: | −1.3934E−02 | −1.0005E+00 | −6.9246E−01 | −4.9514E−01 |
| D: | −8.2697E−02 | 2.0412E+00 | 1.3814E+00 | 1.5185E+00 |
| E: | 1.2532E−01 | −1.5702E+00 | −9.3582E−01 | −2.1021E+00 |
| F: | −1.0531E−01 | 4.1899E−01 | 2.4629E−01 | 1.2432E+00 |
| G: | 0.0000E+00 | 0.0000E+00 | 0.0000E+00 | 0.0000E+00 |
| surface | 6 | 7 | 8 | 9 |
| K: | 5.6798E+00 | −4.8240E−01 | −1.8287E+02 | −8.6282E+00 |
| A: | −9.1845E−03 | −1.4664E−02 | −3.4703E−01 | −1.4650E−01 |
| B: | −7.2747E−02 | 2.1193E−04 | 2.0424E−01 | 7.2803E−02 |
| C: | 1.4884E−01 | 2.5759E−02 | −6.6356E−02 | −2.4788E−02 |
| D: | −1.9012E−02 | −2.8786E−02 | 1.3514E−02 | 5.2321E−03 |
| E: | −1.0127E−01 | 2.4999E−02 | −1.5658E−03 | −6.3479E−04 |
| F: | 8.9110E−02 | −6.9408E−03 | 7.7596E−05 | 3.3370E−05 |
| G: | 0.0000E+00 | 0.0000E+00 | 0.0000E+00 | 0.0000E+00 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 3.66 | f1/f23 | 0.336 |
| Fno | 2.28 | f12/f3 | 0.684 |

-continued

| Embodiment 3 | | | |
|---|---|---|---|
| FOV[deg.] | 76.24 | f12/f4 | −1.138 |
| f1/f3 | 0.533 | R5/R6 | 1.648 |
| f1/f4 | −0.886 | f2/CT4 | −27.509 |
| f2/f3 | −1.864 | f3/CT1 | 7.041 |
| f2/f4 | 3.100 | | |

Figure 4A:
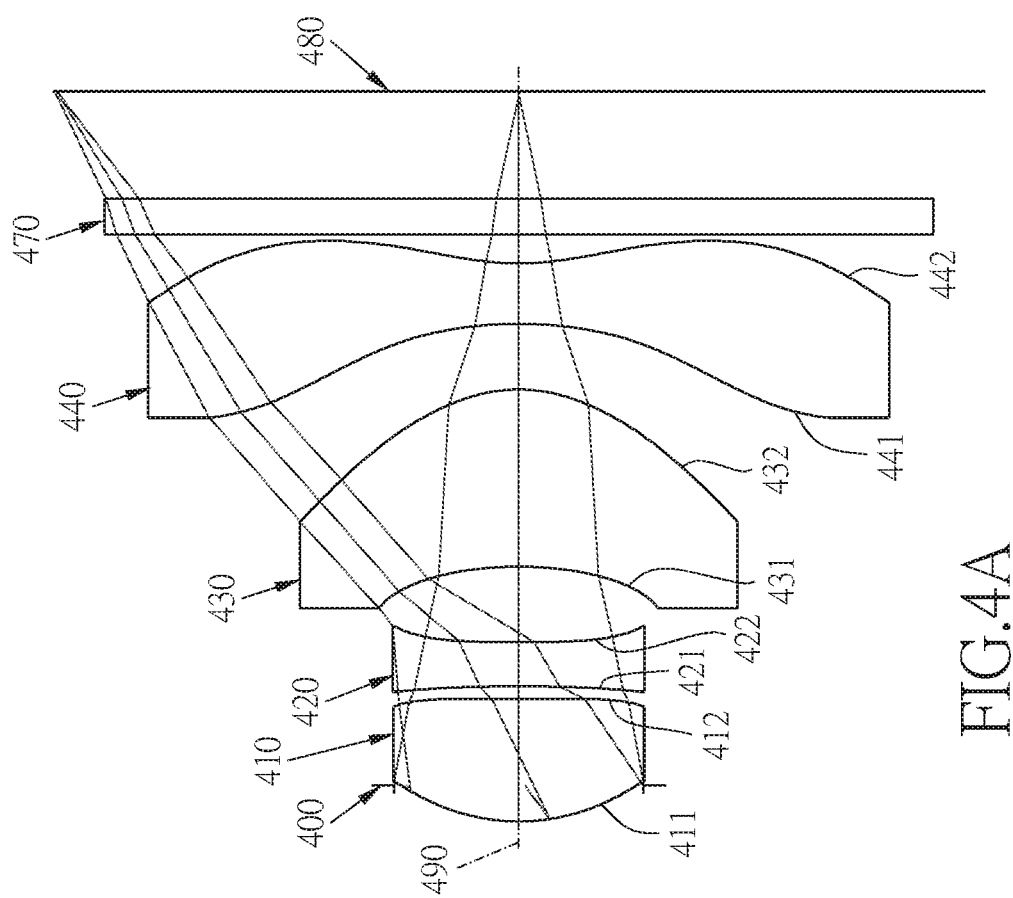
FIG. 4A shows a four-piece optical lens system in accordance with a fourth embodiment of the present invention.
Figure 4B:
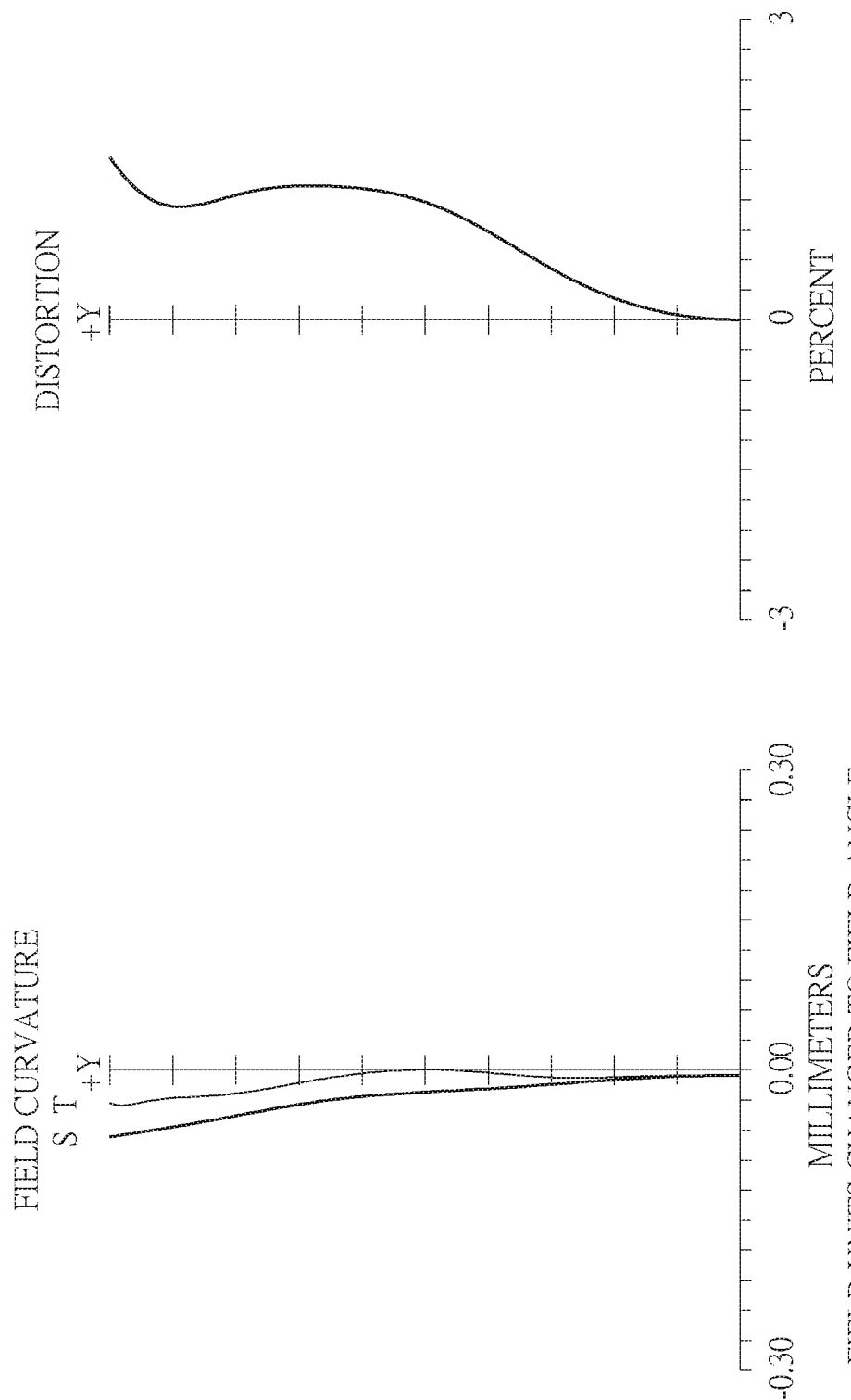
FIG. 4B shows the image plane curve and the distortion curve of the fourth embodiment of the present invention.

Referring to FIGS. 4A and 4B, FIG. 4A shows a four-piece optical lens system in accordance with a fourth embodiment of the present invention, and FIG. 4B shows, in order from left to right, the image plane curve and the distortion curve of the fourth embodiment of the present invention. A four-piece optical lens system in accordance with the fourth embodiment of the present invention comprises a stop 400 and a lens group. The lens group comprises, in order from an object side to an image side: a first lens element 410, a second lens element 420, a third lens element 430, a fourth lens element 440, an IR cut filter 470, and an image plane 480, wherein the four-piece optical lens system has a total of four lens elements with refractive power. The stop 400 is disposed between an object-side surface 411 and an image-side surface 412 of the first lens element 410.

The first lens element 410 with a positive refractive power has the object-side surface 411 being convex near an optical axis 490 and the image-side surface 412 being concave near the optical axis 490, the object-side surface 411 and the image-side surface 412 are aspheric, and the first lens element 410 is made of plastic material.

The second lens element 420 with a negative refractive power has an object-side surface 421 being concave near the optical axis 490 and the image-side surface 422 being concave near the optical axis 490, the object-side surface 421 and the image-side surface 422 are aspheric, and the second lens element 420 is made of plastic material.

The third lens element 430 with a positive refractive power has an object-side surface 431 being concave near the optical axis 490 and an image-side surface 432 being convex near the optical axis 490, the object-side surface 431 and the image-side surface 432 are aspheric, and the third lens element 430 is made of plastic material.

The fourth lens element 440 with a negative refractive power has an object-side surface 441 being concave near the optical axis 490 and an image-side surface 442 being concave near the optical axis 490, the object-side surface 441 and the image-side surface 442 are aspheric, the fourth lens element 440 is made of plastic material, and at least one of the object-side surface 441 and the image-side surface 442 is provided with at least one inflection point.

The IR cut filter 470 made of glass is located between the fourth lens element 440 and the image plane 480 and has no influence on the focal length of the four-piece optical lens system.

The detailed optical data of the fourth embodiment is shown in table 7, and the aspheric surface data is shown in table 8.

TABLE 7

Embodiment 4
f(focal length) = 3.59 mm, Fno = 2.27, FOV = 77.47 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.213 | | | | |
| 2 | Lens 1 | 1.384 | (ASP) | 0.723 | plastic | 1.54 | 56 | 2.598 |
| 3 | | 47.521 | (ASP) | 0.079 | | | | |
| 4 | Lens 2 | −6.245 | (ASP) | 0.259 | plastic | 1.66 | 20.37 | −7.545 |
| 5 | | 26.381 | (ASP) | 0.446 | | | | |
| 6 | Lens 3 | −2.577 | (ASP) | 1.050 | plastic | 1.54 | 56 | 2.533 |
| 7 | | −1.029 | (ASP) | 0.388 | | | | |
| 8 | Lens 4 | −2.914 | (ASP) | 0.357 | plastic | 1.54 | 56 | −1.985 |
| 9 | | 1.799 | (ASP) | 0.174 | | | | |
| 10 | IR-filter | infinity | | 0.210 | glass | 1.52 | 64.2 | |
| 11 | | infinity | | 0.634 | | | | |
| 12 | Image plane | infinity | | — | | | | |

TABLE 8

Aspheric Coefficients

| surface | 2 | 3 | 4 | 5 |
|---|---|---|---|---|
| K: | −1.1704E+00 | −6.4003E+01 | 4.6633E+01 | 2.0008E+02 |
| A: | 4.2204E−02 | 1.6103E−02 | 2.0290E−01 | 2.2834E−01 |
| B: | 3.8644E−02 | −1.6692E−01 | −2.6570E−01 | −1.0329E−01 |
| C: | −1.1125E−01 | −5.4346E−01 | −2.6034E−01 | −8.1741E−02 |
| D: | 1.5419E−01 | 1.1569E+00 | 8.7919E−01 | 6.7226E−01 |
| E: | −1.3755E−01 | −6.6393E−01 | −4.6827E−01 | −1.0103E+00 |
| F: | −8.8808E−03 | −1.7497E−02 | 4.3395E−02 | 7.2166E−01 |
| G: | −3.5868E−03 | −3.3789E−02 | −1.1023E−02 | −1.2183E−02 |

| surface | 6 | 7 | 8 | 9 |
|---|---|---|---|---|
| K: | −1.4019E+01 | −3.7334E+00 | −1.8738E+01 | −1.2564E+01 |
| A: | −1.3341E−01 | −1.6381E−01 | −1.2654E−01 | −6.8025E−02 |
| B: | −1.8536E−01 | 1.2587E−01 | 5.0749E−02 | 2.0138E−02 |
| C: | 9.0849E−01 | −9.1911E−02 | −4.1963E−03 | −3.9656E−03 |

TABLE 8-continued

| | Aspheric Coefficients | | |
|---|---|---|---|
| D: | −2.2199E+00 | 4.6786E−02 | −1.2017E−03 | 3.0085E−04 |
| E: | 2.5347E+00 | −1.1496E−02 | 2.7544E−04 | 1.3924E−05 |
| F: | −1.2481E+00 | 8.0116E−04 | −1.6256E−05 | −2.3658E−06 |
| G: | −9.3792E−03 | 9.2544E−06 | −3.0964E−08 | 1.8745E−08 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 3.59 | f1/f23 | 0.883 |
| Fno | 2.27 | f12/f3 | 1.398 |
| FOV[deg.] | 77.47 | f12/f4 | −1.784 |
| f1/f3 | 1.026 | R5/R6 | 2.504 |
| f1/f4 | −1.308 | f2/CT4 | −21.110 |
| f2/f3 | −2.979 | f3/CT1 | 3.504 |
| f2/f4 | 3.801 | | |

Figure 5A:
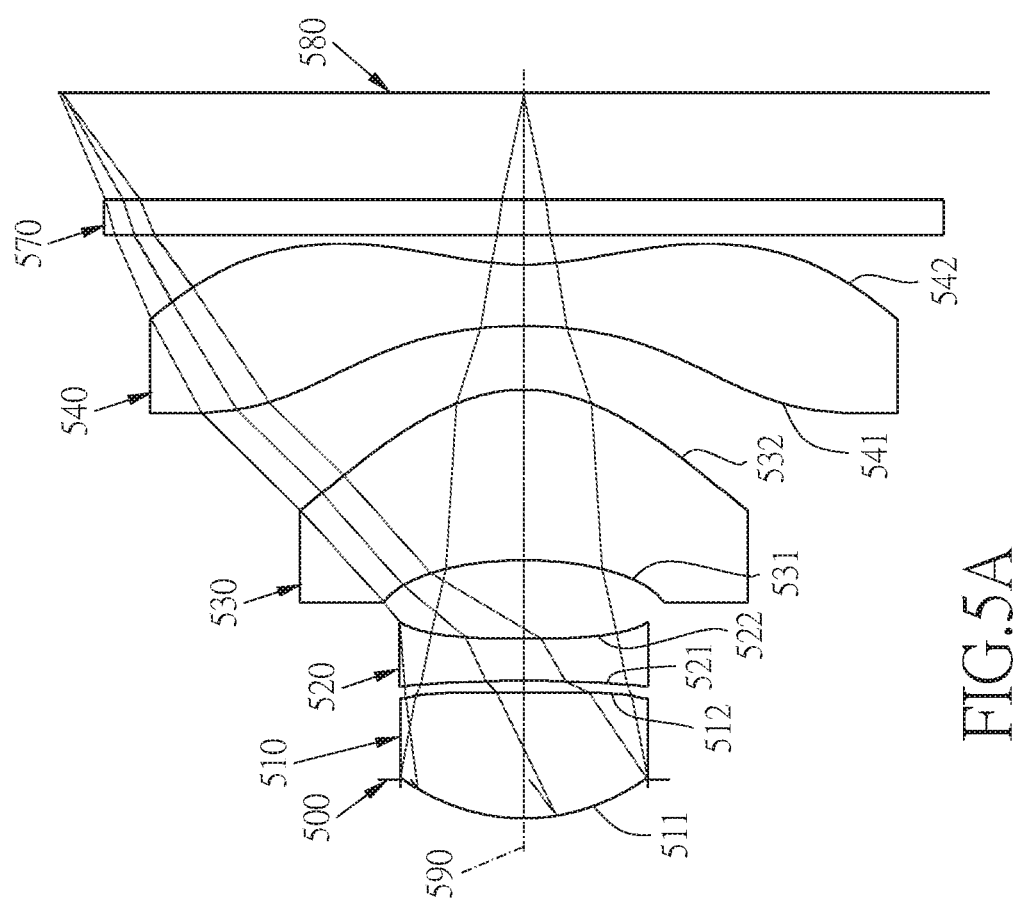
FIG. 5A shows a four-piece optical lens system in accordance with a fifth embodiment of the present invention.

Referring to FIGS. 5A and 5B, FIG. 5A shows a four-piece optical lens system in accordance with a fifth embodiment of the present invention, and FIG. 5B shows, in order from left to right, the image plane curve and the distortion curve of the fifth embodiment of the present invention. A four-piece optical lens system in accordance with the fifth embodiment of the present invention comprises a stop 500 and a lens group. The lens group comprises, in order from an object side to an image side: a first lens element 510, a second lens element 520, a third lens element 530, a fourth lens element 540, an IR cut filter 570, and an image plane 580, wherein the four-piece optical lens system has a total of four lens elements with refractive power. The stop 500 is disposed between an object-side surface 511 and an image-side surface 512 of the first lens element 510.

The first lens element 510 with a positive refractive power has the object-side surface 511 being convex near an optical axis 590 and the image-side surface 512 being concave near the optical axis 590, the object-side surface 511 and the image-side surface 512 are aspheric, and the first lens element 510 is made of plastic material.

The second lens element 520 with a negative refractive power has an object-side surface 521 being concave near the optical axis 590 and the image-side surface 522 being concave near the optical axis 590, the object-side surface 521 and the image-side surface 522 are aspheric, and the second lens element 520 is made of plastic material.

The third lens element 530 with a positive refractive power has an object-side surface 531 being concave near the optical axis 590 and an image-side surface 532 being concave near the optical axis 590, the object-side surface 531 and the image-side surface 532 are aspheric, and the third lens element 530 is made of plastic material.

The fourth lens element 540 with a negative refractive power has an object-side surface 541 being concave near the optical axis 590 and an image-side surface 542 being concave near the optical axis 590, the object-side surface 541 and the image-side surface 542 are aspheric, the fourth lens element 540 is made of plastic material, and at least one of the object-side surface 541 and the image-side surface 542 is provided with at least one inflection point.

The IR cut filter 570 made of glass is located between the fourth lens element 540 and the image plane 580 and has no influence on the focal length of the four-piece optical lens system.

The detailed optical data of the fifth embodiment is shown in table 9, and the aspheric surface data is shown in table 10.

TABLE 9

Embodiment 5
f(focal length) = 3.63 mm, Fno = 2.31, FOV = 77.07 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.231 | | | | |
| 2 | Lens 1 | 1.369 | (ASP) | 0.742 | plastic | 1.54 | 56 | 2.563 |
| 3 | | 52.594 | (ASP) | 0.073 | | | | |
| 4 | Lens 2 | −6.130 | (ASP) | 0.250 | plastic | 1.66 | 20.37 | −7.449 |
| 5 | | 26.675 | (ASP) | 0.463 | | | | |
| 6 | Lens 3 | −2.539 | (ASP) | 1.009 | plastic | 1.54 | 56 | 2.673 |
| 7 | | −1.056 | (ASP) | 0.376 | | | | |
| 8 | Lens 4 | −2.886 | (ASP) | 0.363 | plastic | 1.54 | 56 | −2.038 |
| 9 | | 1.890 | (ASP) | 0.174 | | | | |
| 10 | IR-filter | infinity | | 0.210 | glass | 1.52 | 64.2 | |
| 11 | | infinity | | 0.634 | | | | |
| 12 | Image plane | infinity | | — | | | | |

TABLE 10

Aspheric Coefficients

| surface | 2 | 3 | 4 | 5 |
|---|---|---|---|---|
| K: | −1.1693E+00 | 4.3398E+01 | 4.6706E+01 | 3.0835E+01 |
| A: | 4.4115E−02 | 1.7719E−02 | 2.1270E−01 | 2.3418E−01 |
| B: | 4.1657E−02 | −1.7849E−01 | −2.8652E−01 | −1.1300E−01 |
| C: | −1.2170E−01 | −5.9335E−01 | −2.8856E−01 | −8.7197E−02 |
| D: | 1.7749E−01 | 1.3164E+00 | 9.9807E−01 | 7.5765E−01 |
| E: | −1.5405E−01 | −7.7884E−01 | −5.4015E−01 | −1.1758E+00 |
| F: | −6.2958E−03 | −2.8923E−02 | 5.8024E−02 | 8.5685E−01 |
| G: | 0.0000E+00 | 0.0000E+00 | 0.0000E+00 | 0.0000E+00 |

| surface | 6 | 7 | 8 | 9 |
|---|---|---|---|---|
| K: | −1.4870E+01 | −4.0900E+00 | −2.5310E+01 | −1.2523E+01 |
| A: | −1.3542E−01 | −1.5909E−01 | −1.3073E−01 | −7.2358E−02 |
| B: | −1.8851E−01 | 1.3815E−01 | 5.4460E−02 | 2.1624E−02 |
| C: | 1.0021E+00 | −1.0093E−01 | −4.6702E−03 | −4.3734E−03 |
| D: | −2.5217E+00 | 5.3274E−02 | −1.3652E−03 | 3.4039E−04 |
| E: | 2.9616E+00 | 5.3274E−02 | 3.2079E−04 | 1.6803E−05 |
| F: | −1.4795E+00 | 9.4498E−04 | −1.9705E−05 | −2.8508E−06 |
| G: | 0.0000E+00 | 0.0000E+00 | 0.0000E+00 | 0.0000E+00 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 3.63 | f1/f23 | 0.806 |
| Fno | 2.31 | f12/f3 | 1.304 |
| FOV[deg.] | 77.07 | f12/f4 | −1.711 |
| f1/f3 | 0.959 | R5/R6 | 2.403 |
| f1/f4 | −1.258 | f2/CT4 | −20.512 |
| f2/f3 | −2.787 | f3/CT1 | 3.601 |
| f2/f4 | 3.655 | | |

Figure 6A:
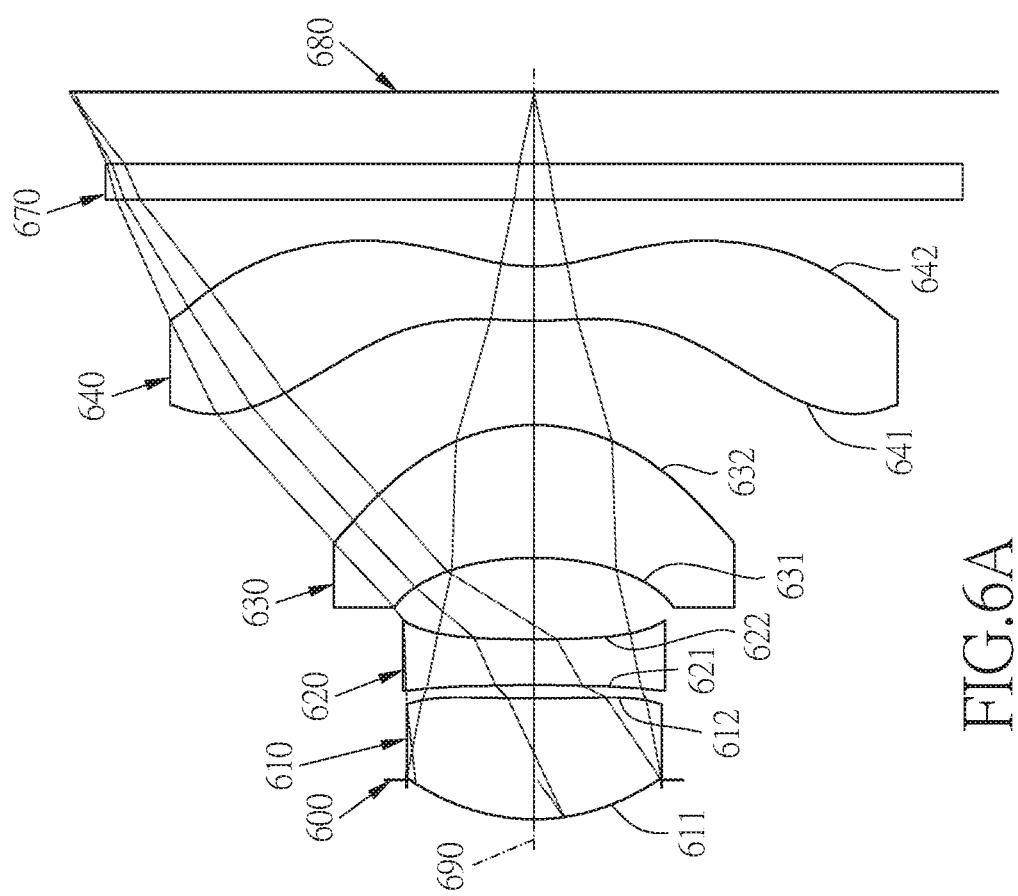
FIG. 6A shows a four-piece optical lens system in accordance with a sixth embodiment of the present invention.
Figure 6B:
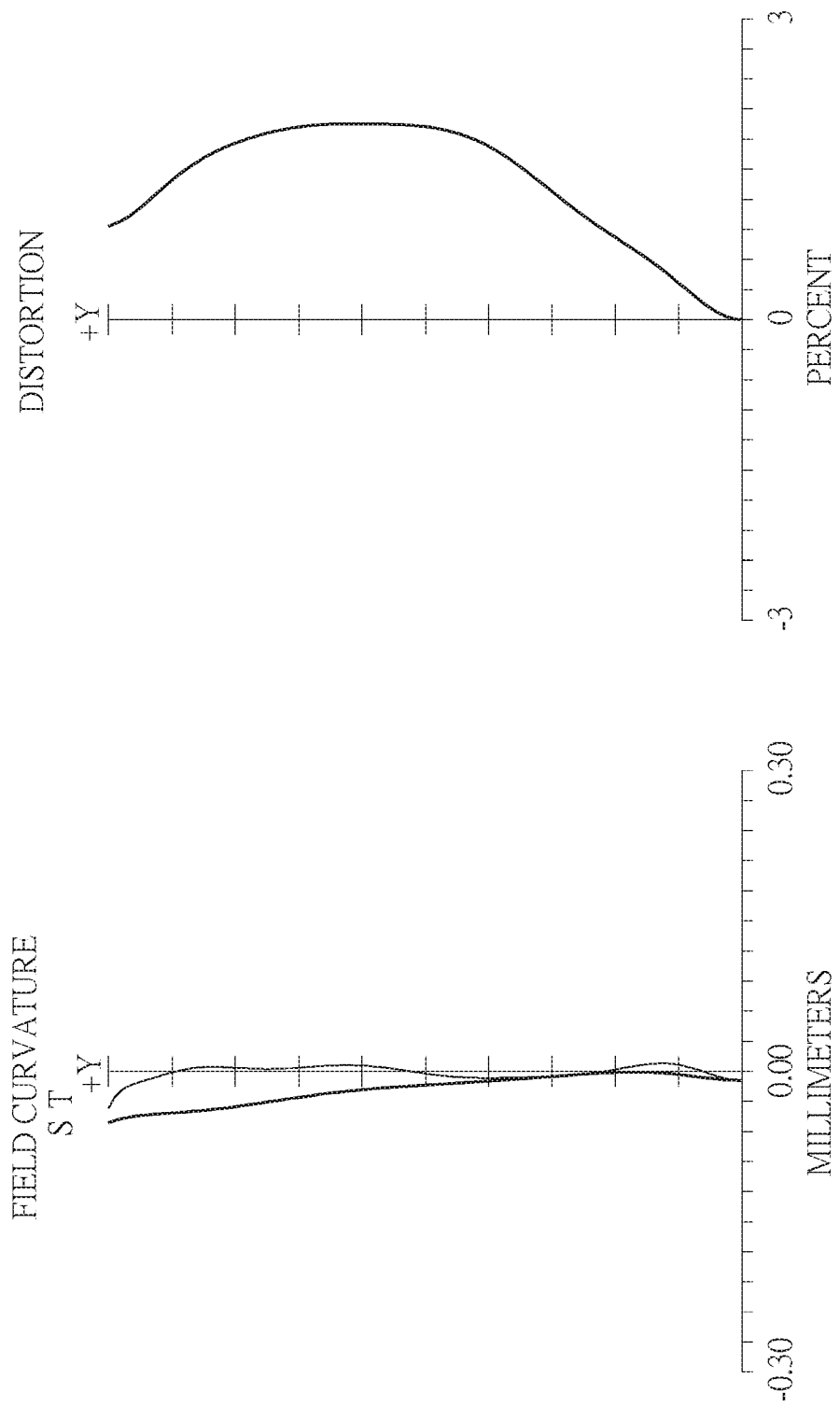
FIG. 6B shows the image plane curve and the distortion curve of the sixth embodiment of the present invention.

Referring to FIGS. 6A and 6B, FIG. 6A shows a four-piece optical lens system in accordance with a sixth embodiment of the present invention, and FIG. 6B shows, in order from left to right, the image plane curve and the distortion curve of the sixth embodiment of the present invention. A four-piece optical lens system in accordance with the sixth embodiment of the present invention comprises a stop 600 and a lens group. The lens group comprises, in order from an object side to an image side: a first lens element 610, a second lens element 620, a third lens element 630, a fourth lens element 640, an IR cut filter 670, and an image plane 680, wherein the four-piece optical lens system has a total of four lens elements with refractive power. The stop 600 is disposed between an object-side surface 611 and an image-side surface 612 of the first lens element 610.

The first lens element 610 with a positive refractive power has the object-side surface 611 being convex near an optical axis 690 and the image-side surface 612 being concave near the optical axis 690, the object-side surface 611 and the image-side surface 612 are aspheric, and the first lens element 610 is made of plastic material.

The second lens element 620 with a negative refractive power has an object-side surface 621 being concave near the optical axis 690 and the image-side surface 622 being concave near the optical axis 690, the object-side surface 621 and the image-side surface 622 are aspheric, and the second lens element 620 is made of plastic material.

The third lens element 630 with a positive refractive power has an object-side surface 631 being concave near the optical axis 690 and an image-side surface 632 being convex near the optical axis 690, the object-side surface 631 and the image-side surface 632 are aspheric, and the third lens element 630 is made of plastic material.

The fourth lens element 640 with a negative refractive power has an object-side surface 641 being convex near the optical axis 690 and an image-side surface 642 being concave near the optical axis 690, the object-side surface 641 and the image-side surface 642 are aspheric, the fourth lens element 640 is made of plastic material, and at least one of the object-side surface 641 and the image-side surface 642 is provided with at least one inflection point.

The IR cut filter 670 made of glass is located between the fourth lens element 640 and the image plane 680 and has no influence on the focal length of the four-piece optical lens system.

The detailed optical data of the sixth embodiment is shown in table 11, and the aspheric surface data is shown in table 12.

TABLE 11

Embodiment 6
f(focal length) = 3.66 mm, Fno = 2.28, FOV = 76.70 deg.

| surface | | Curvature Radius | Thickness | Material | Index | Abbe # | Focal length |
|---|---|---|---|---|---|---|---|
| 0 | object | infinity | infinity | | | | |
| 1 | stop | infinity | −0.232 | | | | |
| 2 | Lens 1 | 1.395 (ASP) | 0.714 | plastic | 1.54 | 56 | 2.827 |

TABLE 11-continued

Embodiment 6
f(focal length) = 3.66 mm, Fno = 2.28, FOV = 76.70 deg.

| surface | | Curvature Radius | | Thickness | Material | Index | Abbe # | Focal length |
|---|---|---|---|---|---|---|---|---|
| 3 | | 11.958 | (ASP) | 0.080 | | | | |
| 4 | Lens 2 | −9.218 | (ASP) | 0.271 | plastic | 1.66 | 20.37 | −9.148 |
| 5 | | 18.270 | (ASP) | 0.480 | | | | |
| 6 | Lens 3 | −2.111 | (ASP) | 0.786 | plastic | 1.54 | 56 | 4.458 |
| 7 | | −1.279 | (ASP) | 0.616 | | | | |
| 8 | Lens 4 | 3.690 | (ASP) | 0.320 | plastic | 1.54 | 56 | −3.106 |
| 9 | | 1.126 | (ASP) | 0.396 | | | | |
| 10 | IR-filter | infinity | | 0.210 | glass | 1.52 | 64.2 | |
| 11 | | infinity | | 0.427 | | | | |
| 12 | Image plane | infinity | | — | | | | |

TABLE 12

Aspheric Coefficients

| surface | 2 | 3 | 4 | 5 |
|---|---|---|---|---|
| K: | −1.2082E−01 | 7.8465E+01 | 2.5602E+01 | −7.0750E+01 |
| A: | −6.3568E−03 | −5.0949E−02 | 8.1926E−02 | 1.6711E−01 |
| B: | 1.9451E−02 | −1.6001E−03 | −1.3533E−02 | 9.3835E−02 |
| C: | −2.9149E−02 | −9.3645E−01 | −7.2169E−01 | −5.4193E−01 |
| D: | −9.5615E−02 | 1.9573E+00 | 1.4126E+00 | 1.5461E+00 |
| E: | 1.4288E−01 | −1.8095E+00 | −8.8551E−01 | −1.9900E+00 |
| F: | −4.5464E−02 | 6.3756E−01 | −2.1335E−01 | 1.0878E+00 |
| G: | −7.6204E−02 | 4.9656E−02 | 4.7073E−01 | 2.2125E−02 |

| surface | 6 | 7 | 8 | 9 |
|---|---|---|---|---|
| K: | 4.3352E+00 | −4.7909E−01 | −1.7169E+02 | −8.4659E+00 |
| A: | −4.2282E−03 | −3.7054E−03 | −3.3030E−01 | −1.4640E−01 |
| B: | −8.3668E−02 | −6.8611E−03 | 2.0147E−01 | 7.2826E−02 |
| C: | 1.4161E−01 | 1.7063E−02 | −6.6771E−02 | −2.4643E−02 |
| D: | −3.2190E−02 | −2.6626E−02 | 1.3536E−02 | 5.2150E−03 |
| E: | −9.7599E−02 | 2.4413E−02 | −1.5456E−03 | −6.3951E−04 |
| F: | 1.2699E−01 | −7.0053E−03 | 8.0840E−05 | 3.4039E−05 |
| G: | −1.7275E−02 | 4.8607E−04 | −8.3555E−07 | 8.3461E−08 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

Embodiment 6

| f[mm] | 3.66 | f1/f23 | 0.433 |
|---|---|---|---|
| Fno | 2.28 | f12/f3 | 0.833 |
| FOV[deg.] | 76.70 | f12/f4 | −1.195 |
| f1/f3 | 0.634 | R5/R6 | 1.651 |
| f1/f4 | −0.910 | f2/CT4 | −28.551 |
| f2/f3 | −2.052 | f3/CT1 | 6.241 |
| f2/f4 | 2.945 | | |

In the present four-piece optical lens system, the lens elements can be made of plastic or glass. If the lens elements are made of plastic, the cost will be effectively reduced. If the lens elements are made of glass, there is more freedom in distributing the refractive power of the four-piece optical lens system. Plastic lens elements can have aspheric surfaces, which allow more design parameter freedom (than spherical surfaces), so as to reduce the aberration and the number of the lens elements, as well as the total track length of the four-piece optical lens system. In the present four-piece optical lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The four-piece optical lens system of the present invention can be used in focusing optical systems and can obtain better image quality. The four-piece optical lens system of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. A four-piece optical lens system, comprising a stop and a lens group having four lens elements, in order from an object side to an image side, comprising:

the stop;
a first lens element with a positive refractive power, having an object-side surface being convex near an optical axis and an image-side surface being concave near the optical axis, at least one of the object-side surface and the image-side surface of the first lens element being aspheric;
a second lens element with a negative refractive power, having an object-side surface being concave near the optical axis and an image-side surface being concave near the optical axis, at least one of the object-side surface and the image-side surface of the second lens element being aspheric;
a third lens element with a positive refractive power, having an object-side surface being concave near the optical axis and an image-side surface being convex near the optical axis, at least one of the object-side surface and the image-side surface of the third lens element being aspheric; and
a fourth lens element with a negative refractive power, having an image-side surface being concave near the optical axis, at least one of an object-side surface and the image-side surface of the fourth lens element being aspheric and provided with an inflection point;
wherein a focal length of the first lens element is f1, the focal length of the third lens element is f3, and they satisfy the relation: $0.4 < f1/f3 \leq 0.643$.

2. The four-piece optical lens system as claimed in claim 1, wherein a focal length of the first lens element is f1, a focal length of the fourth lens element is f4, and they satisfy the relation: $-1.5 < f1/f4 < -0.7$.

3. The four-piece optical lens system as claimed in claim 1, wherein a focal length of the second lens element is f2, the focal length of the third lens element is f3, and they satisfy the relation: $-3.2 < f2/f3 < -1.7$.

4. The four-piece optical lens system as claimed in claim 1, wherein a focal length of the second lens element is f2, a focal length of the fourth lens element is f4, and they satisfy the relation: $2.7 < f2/f4 < 4.1$.

5. The four-piece optical lens system as claimed in claim 1, wherein a focal length of the first lens element is f1, a focal length of the second lens element and the third lens element combined is f23, and they satisfy the relation: $0.2 < f1/f23 < 1.1$.

6. The four-piece optical lens system as claimed in claim 1, wherein the focal length of the first lens element and the second lens element combined is f12, a focal length of the fourth lens element is f4, and they satisfy the relation: $-2.0 < f12/f4 < -1.0$.

7. The four-piece optical lens system as claimed in claim 1, wherein a radius of curvature of the object-side surface of the third lens element is R5, a radius of curvature of the image-side surface of the third lens element is R6, and they satisfy the relation: $1.5 < R5/R6 < 2.7$.

8. The four-piece optical lens system as claimed in claim 1, wherein a focal length of the second lens element is f2, a central thickness of the fourth lens element along the optical axis is CT4, and they satisfy the relation: $-29 < f2/CT4 < -20$.

9. The four-piece optical lens system as claimed in claim 1, wherein the focal length of the third lens element is f3, a central thickness of the first lens element along the optical axis is CT1, and they satisfy the relation: $3 < f3/CT1 < 7.2$.

10. The four-piece optical lens system as claimed in claim 1, wherein a focal length of the first lens element and the second lens element combined is f12, a focal length of the third lens element is f3, and they satisfy the relation: $0.6 < f12/f3 < 1.6$.

11. A four-piece optical lens system, comprising a stop and a lens group having four lens elements, in order from an object side to an image side, comprising:
the stop;
a first lens element with a positive refractive power, having an object-side surface being convex near an optical axis and an image-side surface being concave near the optical axis, at least one of the object-side surface and the image-side surface of the first lens element being aspheric;
a second lens element with a negative refractive power, having an object-side surface being concave near the optical axis and an image-side surface being concave near the optical axis, at least one of the object-side surface and the image-side surface of the second lens element being aspheric;
a third lens element with a positive refractive power, having an object-side surface being concave near the optical axis and an image-side surface being convex near the optical axis, at least one of the object-side surface and the image-side surface of the third lens element being aspheric; and
a fourth lens element with a negative refractive power, having an image-side surface being concave near the optical axis, at least one of an object-side surface and the image-side surface of the fourth lens element being aspheric and provided with an inflection point;
wherein a focal length of the first lens element is f1, a focal length of the fourth lens element is f4, and they satisfy the relation: $-1.5 < f1/f4 \leq -1.258$.

* * * * *